*L. S. Chichester,*

*Water Filter,*

N°28,533. Patented May 29, 1860.

Witnesses:

Inventor:
Lewis S. Chichester

UNITED STATES PATENT OFFICE.

L. S. CHICHESTER, OF NEW YORK, N. Y., ASSIGNOR TO F. S. CABOT, OF SAME PLACE.

FILTER.

Specification of Letters Patent No. 28,533, dated May 29, 1860.

*To all whom it may concern:*

Be it known that I, L. S. CHICHESTER, of the city, county, and State of New York, have invented a new and Improved Faucet-Filter, and I do hereby declare that the following is a full, clear, and exact description of the same, reference being had to the annexed drawings, making a part of this specification, in which—

Figure 1:
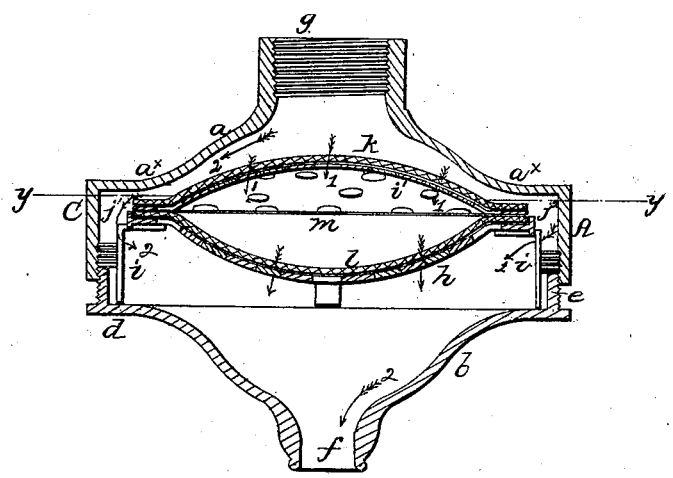
Figure 2:
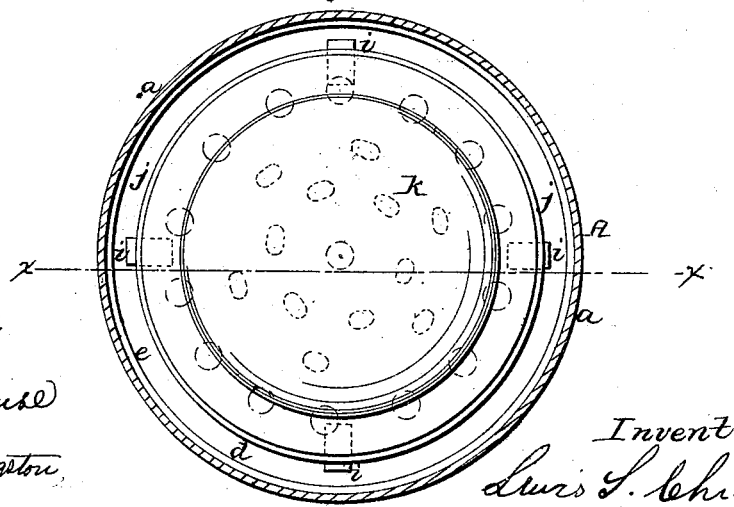

Figure 1 is a side sectional view of my invention taken in the line $x$, $x$, Fig. 2. Fig. 2 a horizontal section of the same taken in the line $y$, $y$, Fig. 1.

Similar letters of reference indicate corresponding parts in both figures.

To enable those skilled in the art to fully understand and construct my invention I will proceed to describe it.

A represents the shell or case of the filter which may be of cylindrical form and provided with convex top and bottom plates $a$, $b$, the form of which is shown clearly in Fig. 1. The shell or case however is not confined to this particular form, various forms might be used and all answer equally well. The shell or case is formed of two horizontal parts $c$, $d$, the lower part of $d$, being comprised of the plate $b$, which is provided with a screw flanch $e$, which screws into the lower part of the body of the case or shell which forms a portion of the upper part $c$, of the case or shell as shown clearly in Fig. 1.

The eduction orifice $f$, of the case or shell is at the center of the bottom plate $b$, of the case and the induction orifice $g$, is at the center of the upper plate $a$. This orifice is provided with an internal screw thread by which the case is screwed on the water pipe.

Within the case or shell A, a concave perforated plate $h$, is fitted. This plate is supported at a suitable height by lugs $i$, which are attached to it and rest on the bottom plate $b$, and on the concave plate $h$, a perforated convex plate $i$, is placed. The plates $h$, $i$, are of equal diameter and they are somewhat less than the inner diameter of the body of the case in order to allow a space $j$, between the edges of the plates and the inner side of the case.

The upper surface of the plate $i'$ is covered by a piece of felt or other suitable filtering medium or material $k$, and a similar substance $l$, is placed on the concave plate $h$. The space or chamber $m$, between the two plates may be filled with any suitable filtering material if desired, such as charcoal, broken glass etc.

The upper plate $a$, of the case A, near its junction with the body of the case is horizontal and parallel with the outer part of the plate $i'$, as shown at $a^x$, Fig. 1, so that when the lower part $d$, of the case A, is screwed fully up to part $c$, the outer part of the plate $i'$, will be pressed against the horizontal outer part $a^x$, of plate $a$, and the water therefore compelled to pass through the filtering medium as indicated by arrows 1, and consequently will be filtered. The inner part of the case $a$ at $a^x$, instead of being made horizontal, may be shaped into the form of a projecting flange or ridge, so that the plate ($i$) will come into contact with such ridge instead of the flat part of plate $a$. When filtered water is not required the lower part $d$, of the case is screwed down and a space allowed between the part $a^x$ of the plate $a$, and the outer part of plate $i'$, and the water will consequently pass unobstructed down through the space $j$, below the concave plate $h$, and out through the eduction orifice $f$, as indicated by arrows 2. It will be seen therefore that by simply adjusting the lower part $d$, of the case filtered or unfiltered water may be drawn as desired.

Having thus described my invention what I claim as new and desire to secure by Letters Patent, is—

The combination in the manner herein shown and described of the plates $i$, $h$, and the filtering materials, with the adjustable plates $a$, $d$, when all the said parts are constructed substantially as set forth, so that by adjusting either of the plates $a$, $d$, filtered or unfiltered water may be obtained at pleasure, as specified.

LEWIS S. CHICHESTER.

Witnesses:
B. GIROUX,
M. M. LIVINGSTON.